(12) United States Patent
Muter et al.

(10) Patent No.: US 8,932,531 B2
(45) Date of Patent: Jan. 13, 2015

(54) CATALYTIC CONVERTER APPARATUS

(75) Inventors: John P. Muter, King City (CA); Haiqing Liu, Richmond Hill (CA)

(73) Assignee: DCL International Inc., Concord (CA)

( * ) Notice: Subject to any disclaimer, the term of this patent is extended or adjusted under 35 U.S.C. 154(b) by 322 days.

(21) Appl. No.: 13/457,981

(22) Filed: Apr. 27, 2012

(65) Prior Publication Data

US 2013/0287635 A1 Oct. 31, 2013

(51) Int. Cl.
*B01D 50/00* (2006.01)

(52) U.S. Cl.
USPC .......................................... 422/177; 422/180

(58) Field of Classification Search
USPC .................... 422/177, 180; 55/523
See application file for complete search history.

(56) References Cited

U.S. PATENT DOCUMENTS

| | | | |
|---|---|---|---|
| 4,849,185 A | 7/1989 | Wittig | |
| 5,169,604 A | 12/1992 | Crothers, Jr. | |
| 5,656,245 A | 8/1997 | Fujisawa et al. | |
| 5,746,986 A | 5/1998 | Pollock et al. | |
| 7,157,060 B1 | 1/2007 | Newburry | |
| 7,410,621 B2 | 8/2008 | Muter et al. | |
| 7,412,824 B1 | 8/2008 | Newburry et al. | |
| 7,655,194 B2 | 2/2010 | Muter | |
| 7,919,052 B2 | 4/2011 | Ahmed | |
| 8,062,602 B2 | 11/2011 | Roe et al. | |
| 8,066,950 B2 | 11/2011 | Newburry et al. | |
| 2006/0159597 A1* | 7/2006 | Muter et al. | 422/168 |
| 2010/0129270 A1 | 5/2010 | Roe et al. | |

* cited by examiner

*Primary Examiner* — Tom Duong
(74) *Attorney, Agent, or Firm* — Bereskin & Parr LLP/S.E.N.C.R.L., s.r.l.

(57) ABSTRACT

A catalytic converter apparatus includes a housing having an inlet port, an outlet port, a chamber, an access opening, and an interior sealing surface generally encompassing a periphery of one of the inlet and outlet ports in the chamber. A substrate assembly is insertable into the chamber and removable from the chamber through the access opening, and includes a catalyst matrix for treating fluid. A positioning mechanism removably supports the substrate assembly within the chamber so that movement of the substrate assembly in a lateral direction generally parallel to the interior sealing surface moves the substrate assembly in an axial direction generally perpendicular to the interior sealing surface. The positioning mechanism may guide the substrate assembly in the axial direction into sealing engagement with the one of the inlet and outlet ports to provide a fluid flow path through the catalyst matrix between the inlet and outlet ports.

25 Claims, 10 Drawing Sheets

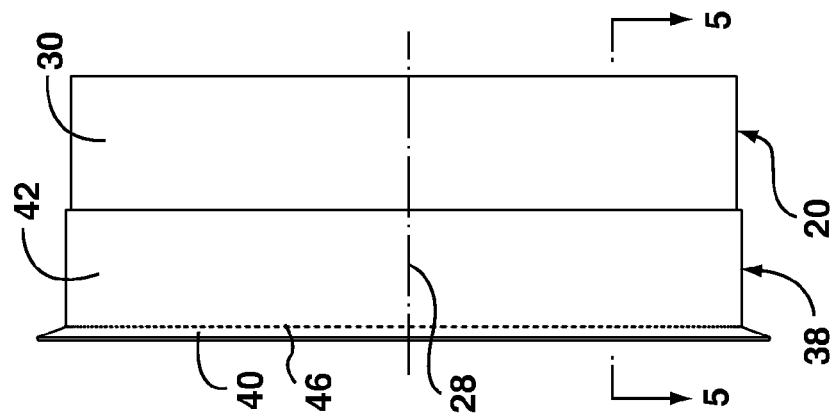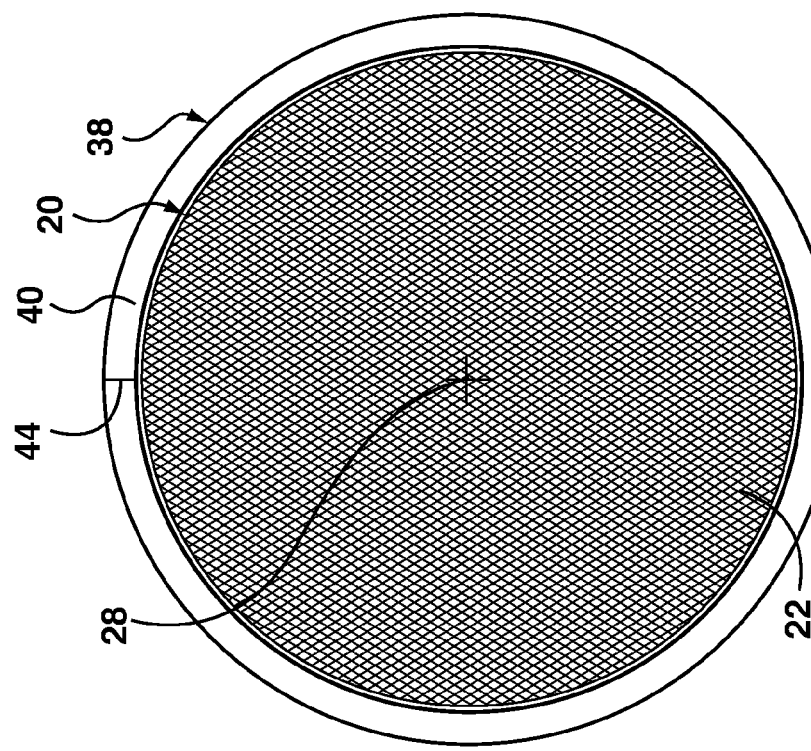

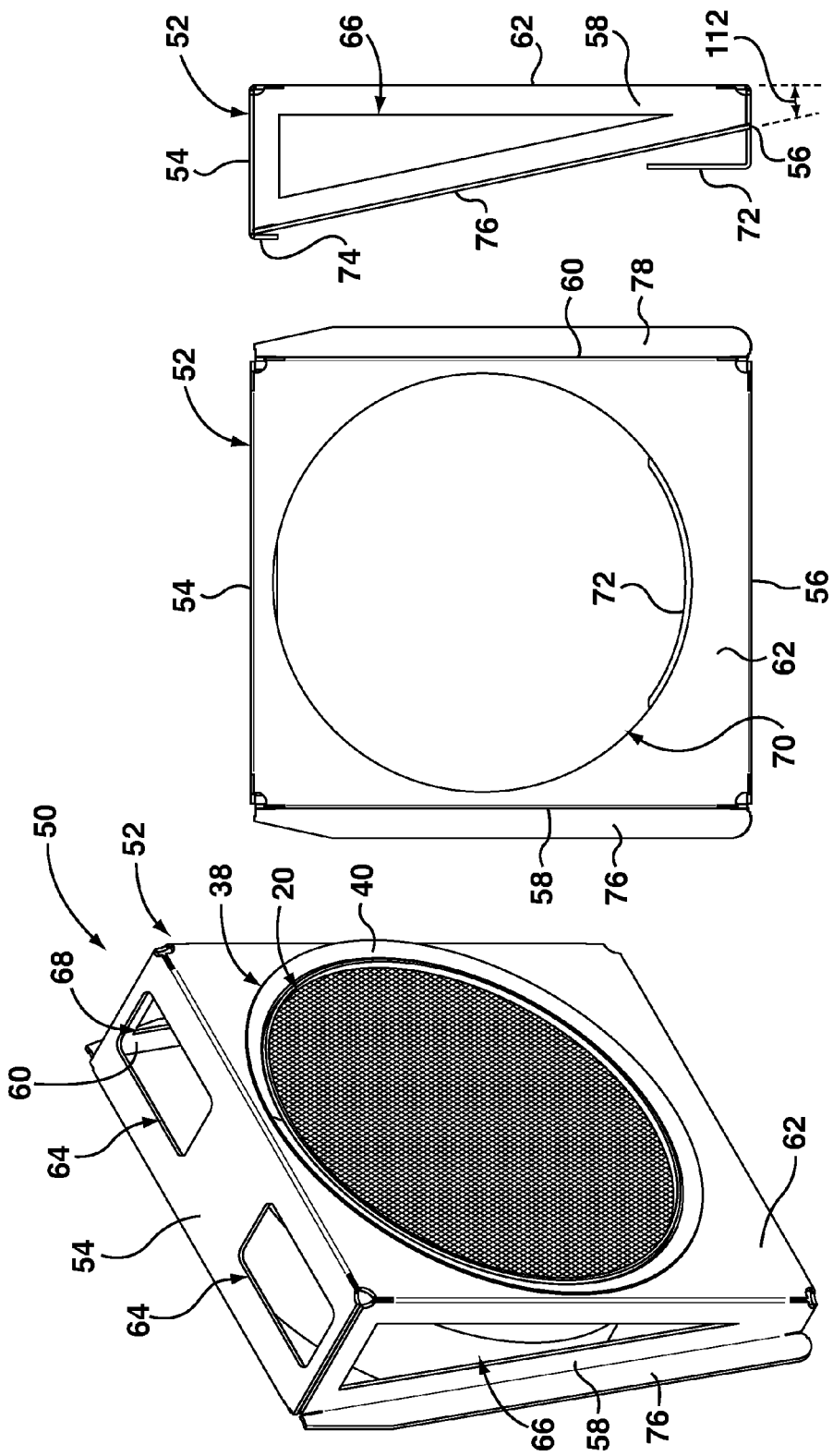

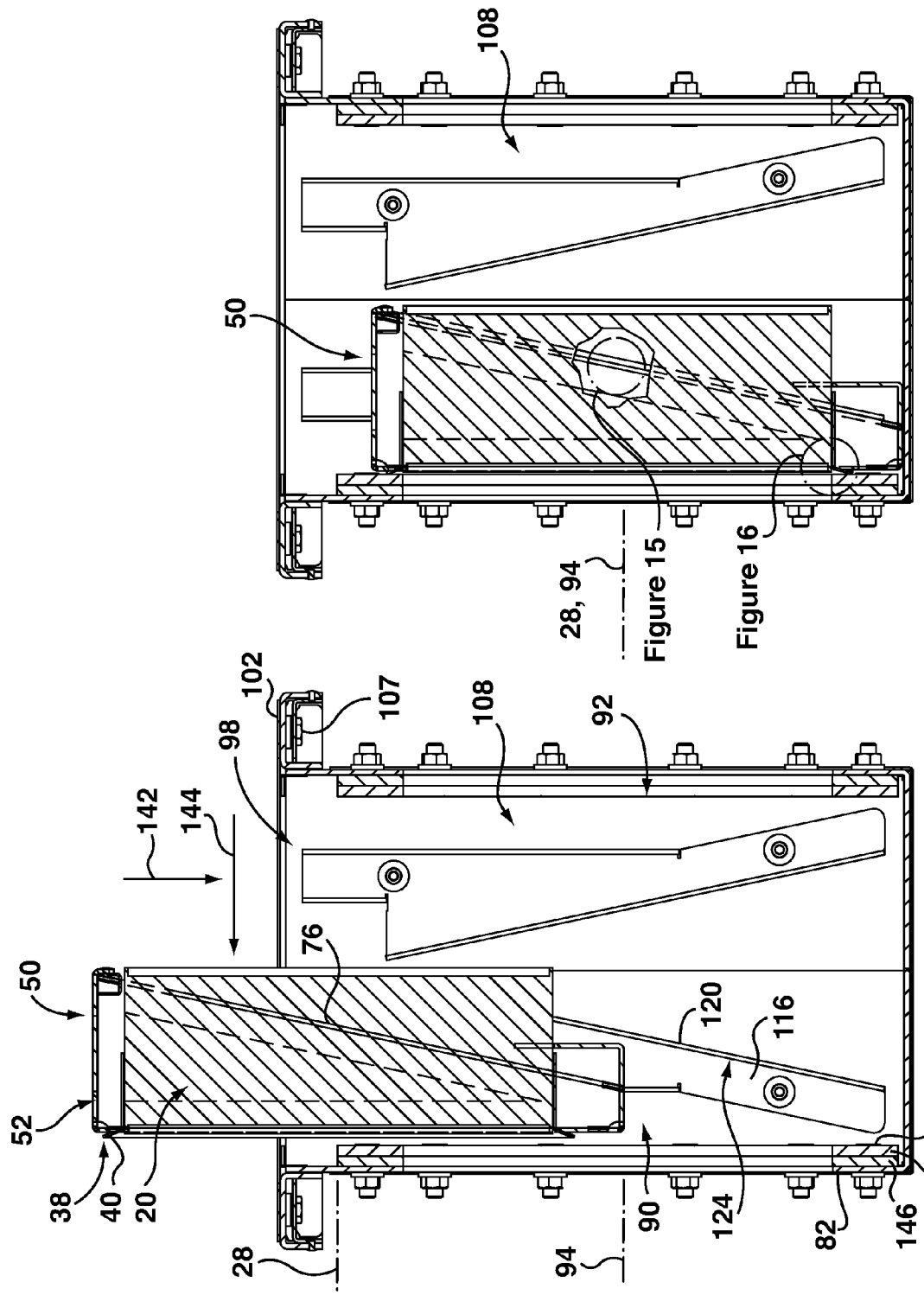

CATALYTIC CONVERTER APPARATUS

FIELD

The present disclosure relates generally to catalytic converter apparatuses, and particularly to installing a catalyst matrix within a housing.

BACKGROUND

The following paragraphs are not an admission that anything discussed in them is prior art or part of the knowledge of persons skilled in the art.

U.S. Pat. No. 7,410,621 describes a catalyst substrate with a peripheral mantle extending thereabout and having opposite end walls between which the substrate is disposed. At least one of the end walls acts as a forward seal which is maintained in close proximity with a corresponding sealing surface toward an inlet end of the catalytic converter housing. A retaining member is provided which maintains the sealing surfaces in close proximity to define a labyrinth seal therebetween.

U.S. Pat. No. 7,655,194 describes a catalyst substrate support for a corrugated foil honeycomb matrix defining a plurality of passages extending therethrough which are generally parallel to an axis. A peripheral mantle extends about an outer perimeter of the matrix and has inwardly extending flanges which extend across an outer periphery of the opposite end faces to cover outermost of the passages and restrict fluid flow between the peripheral mantle and the matrix. The outer perimeter of the matrix and the peripheral mantle may be spaced apart to define a gap for accommodating differential thermal expansions of the matrix and the peripheral mantle, the gap being smaller than a height of the inwardly extending flanges. Cross members secured to each of the opposite end faces of the matrix may transfer at least part of the gravitational load of the matrix to the mantle.

U.S. Pat. No. 7,919,052 describes securing a catalyst element in a catalytic converter with a bolted bar. The catalytic converter has a housing. The housing defines a conduit and has a support wall defining an opening in the conduit. A removable catalyst element covers the opening for treating an exhaust gas passing through the conduit. A removable bar abuts the catalyst element. A first end of the bar is anchored to the wall and a second end of the bar is bolted to the wall thus clamping the catalyst element between the wall and the bar.

SUMMARY

The following paragraphs are intended to introduce the reader to the more detailed description that follows and not to define or limit the claimed subject matter.

According to an aspect of the present disclosure, a catalytic converter apparatus may include: a housing including an inlet port, an outlet port spaced apart from the inlet port, a chamber between the inlet and outlet ports, an access opening for access to the chamber, and an interior sealing surface generally encompassing a periphery of one of the inlet and outlet ports in the chamber; a substrate assembly insertable into the chamber and removable from the chamber through the access opening, the substrate assembly including a catalyst matrix for treating fluid; and a positioning mechanism for removably supporting the substrate assembly within the chamber so that movement of the substrate assembly in a lateral direction generally parallel to the interior sealing surface moves the substrate assembly in an axial direction generally perpendicular to the interior sealing surface.

According to an aspect of the present disclosure, a method of installing a substrate assembly in a housing, the housing including an inlet port, an outlet port spaced apart from the inlet port, a chamber between the inlet and outlet ports, an access opening, and an interior sealing surface generally encompassing a periphery of one of the inlet and outlet ports in the chamber, may include: inserting the substrate assembly into the chamber through the access opening; engaging the substrate assembly with a positioning mechanism in the chamber, the positioning mechanism removably supporting the substrate assembly within the chamber so that movement of the substrate assembly in a lateral direction generally parallel to the interior sealing surface moves the substrate assembly in an axial direction generally perpendicular to the interior sealing surface; and moving the substrate assembly in the lateral direction relative to the housing to guide the substrate assembly in the axial direction into sealing engagement with the one of the inlet and outlet ports, thereby providing a fluid flow path through the substrate assembly between the inlet and outlet ports.

According to an aspect of the present disclosure, a catalytic converter apparatus may include: a housing including a port, and an interior sealing surface generally encompassing a periphery of the port; and a substrate assembly removably supported relative to the housing, the substrate assembly including a frame, a catalyst matrix supported by the frame and including an end face, and a flange element extending about a periphery of the end face of the catalyst matrix, wherein the flange element abuts the interior sealing surface, wherein the frame engages the flange element, and wherein the frame distributes force to the flange element so that the flange element bears against the interior sealing surface to provide a generally sealed fluid flow path through the catalyst matrix and the port.

BRIEF DESCRIPTION OF THE DRAWINGS

The drawings included herewith are for illustrating various examples of apparatuses and methods of the present disclosure and are not intended to limit the scope of what is taught in any way. In the drawings:

FIGS. 3 and 4 are front and side views of the catalyst matrix and the collar of FIG. 1;

FIG. 6 is a front perspective view of the catalyst matrix and the collar of FIG. 1 mounted to a frame, forming a substrate assembly;

FIGS. 7 and 8 are front and side views of the frame of FIG. 6;

FIGS. 13 and 14 are sectional views along line 13-13 in FIG. 11, and showing the substrate assembly being installed in the housing;

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

Catalytic converters may be broadly grouped into vehicle sized units and stationary engine or industrial sized units. Vehicle sized units may be considerably smaller than industrial sized ones, and accordingly may be relatively easy to remove and to disassemble. For example, the diameter of a catalyst substrate for vehicle sized units may measure less than a foot (approximately 0.3 m). In contrast, large industrial sized units may have catalyst substrate diameters that measure up to, for example but not limited to, about six feet (approximately 2 m). The associated ducting and sheer size of the components may inhibit simple removal and axial disassembly of an industrial sized unit from a gas flow line in which it is mounted for replacing the catalyst substrate. Instead, large industrial sized catalytic converter housings may be provided with a lateral access port for removal of the catalyst substrate from a side of the housing, without removal or axial separation of the housing from its associated ductwork.

In general, the concepts described herein pertain to catalytic converter apparatuses that may be suitable for relatively large, industrial or stationary power applications. The apparatuses include a housing, a substrate assembly that is inserted into and removed from the housing through an access opening, and a positioning mechanism that removably supports the substrate assembly in the housing and enables sealing engagement between the substrate assembly and a port of the housing.

Figure 2:
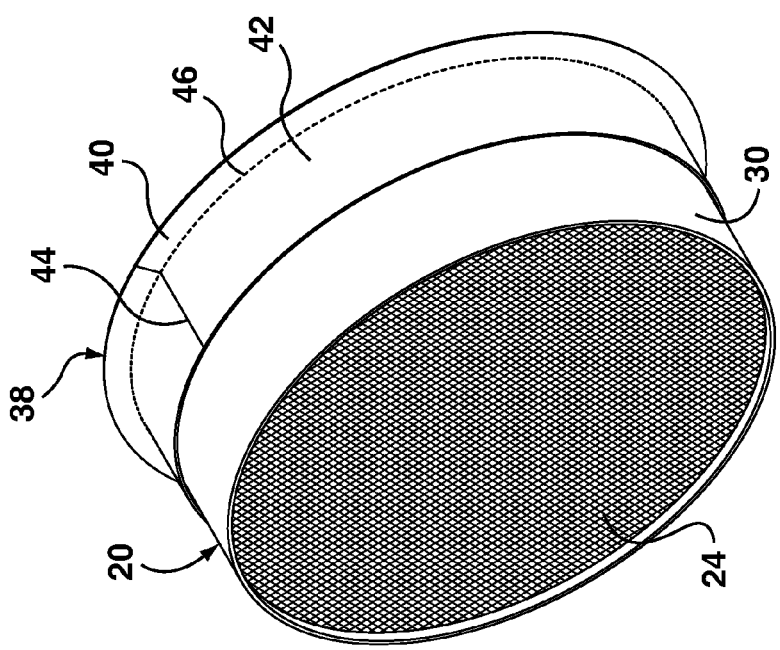
FIG. 2 is a rear perspective view of the catalyst matrix and the collar of FIG. 1.
Figure 1:
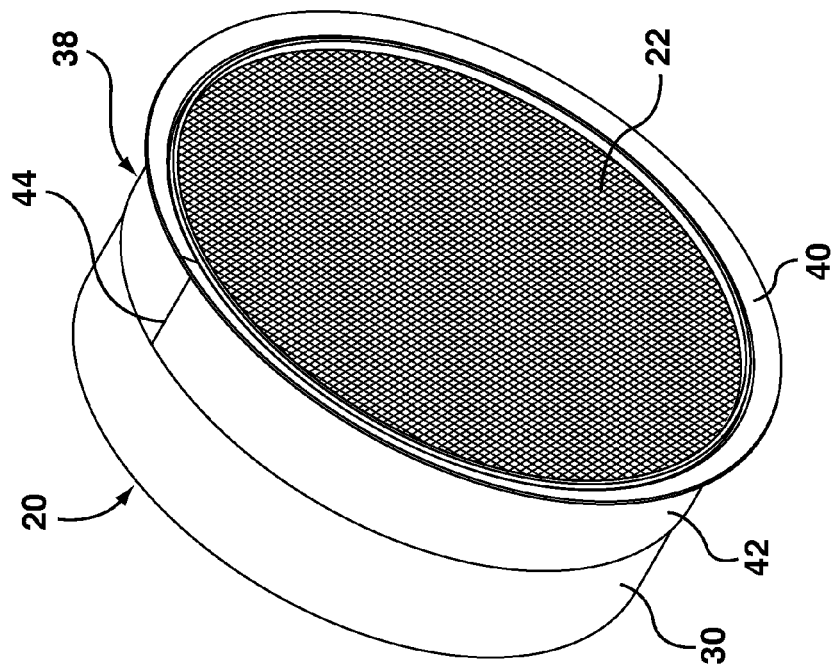
FIG. 1 is a front perspective view of a catalyst matrix and a collar mounted to the catalyst matrix.

Referring to FIGS. 1 and 2, an example of a catalyst matrix is shown generally at reference number 20. The catalyst matrix 20 includes generally opposite first and second end faces 22, 24. In the example illustrated, the catalyst matrix 20 is generally circular in cross section, and generally cylindrical in shape having a cylindrical periphery or side surface 32 (FIG. 5) extending between the end faces 22, 24. In some examples, the catalyst matrix may be configured to have other shapes and sizes.

The catalyst matrix 20 is adapted to treat or otherwise condition fluids that may include, for example but not limited to, exhaust gases from an internal combustion engine, or process fluid from an industrial process. The catalyst matrix 20 includes a substrate that may be formed of, for example but not limited to, a ceramic honeycomb, corrugated metal foil sheets, flat metal foil sheets, and/or another material structured to provide a relatively high surface area for contact with the fluid to be treated, and may be loaded with an effective amount of catalytic material. In the example illustrated (FIG. 5), the catalyst matrix 20 defines passages 26 that extend generally between the end faces 22, 24 to permit fluid flow therethrough. The passages 26 may be generally parallel to a substrate axis 28 of the catalyst matrix 20 (shown in FIGS. 3 and 4).

With reference again to FIG. 5, the catalyst matrix 20 is shown to include a peripheral mantle 30 that extends about the side surface 32. The peripheral mantle 30 may be generally fluid impervious, so that fluid flow is constrained in the catalyst matrix 20 between the end faces 22, 24. In the example illustrated, the peripheral mantle 30 has opposed end edges 30a, 30b that are spaced axially outboard of the end faces 22, 24 to define gaps 34, 36, respectively. The gaps 34, 36 may help to accommodate dimensional variations during manufacturing. Furthermore, the gaps 34, 36 may accommodate different rates of expansion and contraction of the peripheral mantle 30 relative to the rest of the catalyst matrix 20.

Referring again to FIGS. 1 and 2, a collar 38 is mounted around the catalyst matrix 20. The collar 38 includes a flange element 40 that extends generally about a periphery of the first end face 22. The flange element 40 may be formed of a flexible, resilient, and heat resistant material, for example but not limited to, stainless steel. In the example illustrated, the flange element 40 is coupled to an annular wall 42 that generally wraps around at least a portion of the length of the peripheral mantle 30. The collar 38 may be formed of a generally rectangular sheet of metal, bent and curved into shape to define the flange element 40 and the annular wall 42, with ends joined at a seam 44. In some examples, the collar may be formed by punching or pressing operations.

In the example illustrated, the flange element 40 is flared outwardly at an angle relative to the annular wall 42. As described in further detail below, the flange element 40 is configured to flex relative to the annular wall 42 (shown in FIG. 16). Furthermore, a line or region of reduced thickness 46 (also shown in FIG. 16) may be arranged generally between the flange element 40 and the annular wall 42. The line of reduced thickness 46 may permit failure of the collar 38 in misfire or other abnormally high pressure pulsation situations, so as to avoid or at least reduce damage to the catalyst matrix 20.

Referring again to FIG. 5, in some examples, the annular wall 42 of the collar 38 may be fixed to the peripheral mantle 30 by a weld 48. In some examples, the annular wall 42 and the peripheral mantle 30 may be configured for friction fit or interference fit engagement, so that the collar 38 is generally securely fixed to the peripheral mantle 30 of the catalyst matrix 20.

In some examples, the peripheral mantle 30 may be omitted, as long as the side surface 32 of the catalyst matrix 20 is sufficiently fluid impervious. In these examples, the annular wall 42 may be fixed to the side surface 32. Furthermore, in some examples, the annular wall 42 may be omitted, and the flange element 40 may be fixed to the peripheral mantle 30, or to the side surface 32. In some examples, the flange element 40 may be made integral with the peripheral mantle 30. In some examples, the flange element 40 may be formed integral with the catalyst matrix 20. Various configurations are possible.

Referring now to FIG. 6, a substrate assembly 50 is formed by a combination of the catalyst matrix 20 and the collar 38, held in a frame 52. Referring to FIGS. 6, 7 and 8, the frame 52 is shown to include a top side plate 54, a bottom side plate 56 spaced apart from the top side plate 54, a left side plate 58, a right side plate 60 spaced apart from the left side plate 58, and a front plate 62 extending generally between the side plates 54, 56 and the side plates 58, 60. The top side plate 54 may include cutouts 64, and the side plates 58, 60 may include cutouts 66, 68, respectively, which may help to reduce weight of the frame 52 and allow for circulation of fluid around the catalyst matrix 20.

In the example illustrated, the front plate 62 of the frame 52 includes a circular opening 70 that is sized and shaped to slidingly receive the catalyst matrix 20, but not the flange element 40, so that the flange element 40 engages the front plate 62 in opposed relation. Furthermore, the bottom side plate 56 extends upwardly at its rear edge to form an upstanding support plate 72, which may help to bear at least a portion of the weight of the catalyst matrix 20 once received in the circular opening 70. Moreover, the top side plate 54 extends to provide a rearward lip 74, which may serve as a handle for a user to hold the substrate assembly 50. Finally, the frame 52 includes outwardly extending first and second flaps 76, 78 coupled to the side plates 58, 60, respectively. The flaps 76, 78 are arranged at a flap angle 112 relative to the front plate 62.

The plates 54, 56, 58, 60, 62 may all be formed from a single sheet of material (for example, stainless steel). In the example illustrated, each of the side plates 54, 56, 58, 60 is formed (for example, using a bending brake) at about a 90° angle relative to the front plate 62, and each may be connected to its respective adjacent two of the side plates 54, 56, 58, 60, thereby forming a relatively rigid yet lightweight structure. In particular, the side plates 54, 56, 58, 60, being arranged orthogonally relative to the front plate 62, may provide stiffness to generally evenly distribute force between the flaps 76, 78 and the front plate 62.

Figure 9:
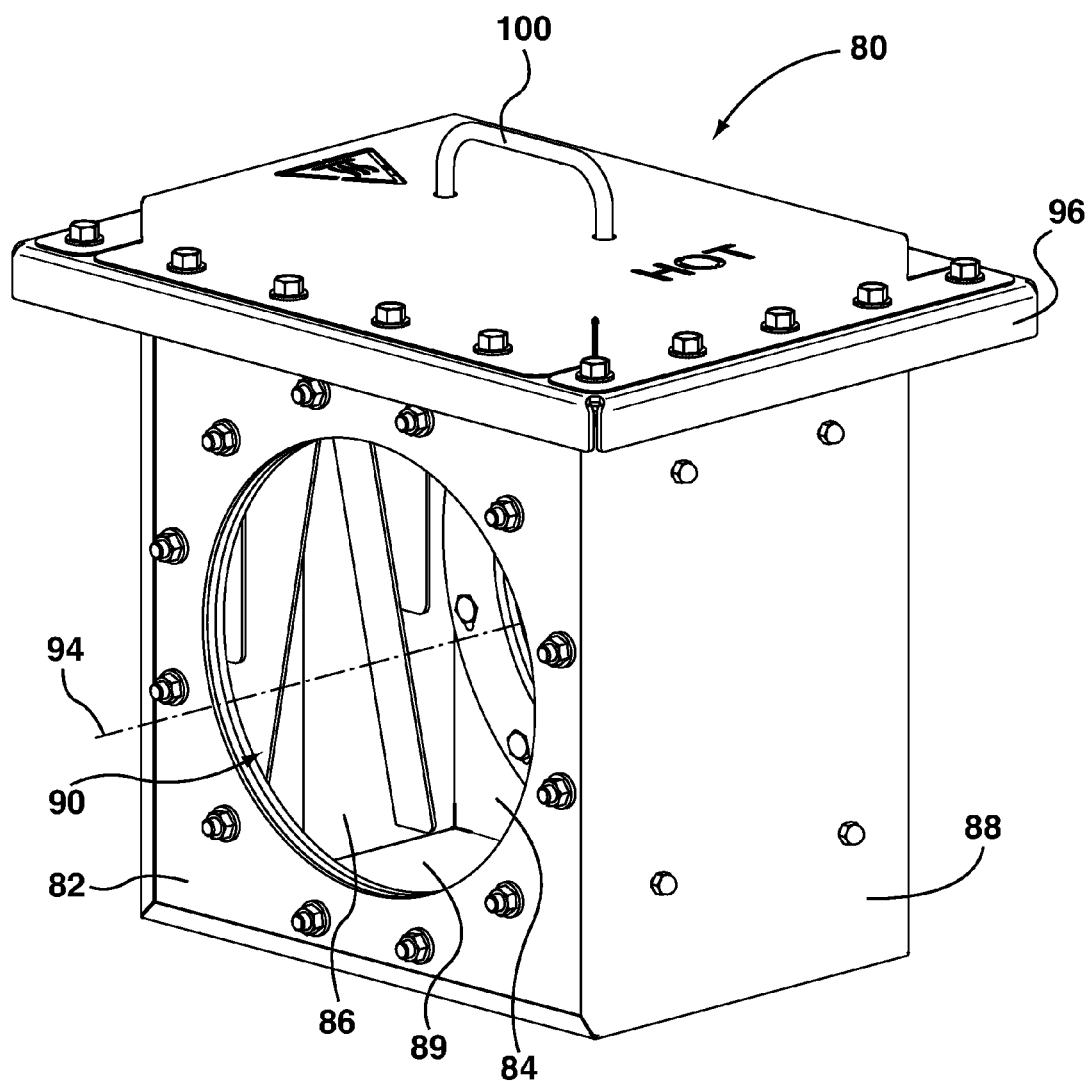
FIG. 9 is a front perspective view of a housing.
Figure 10:
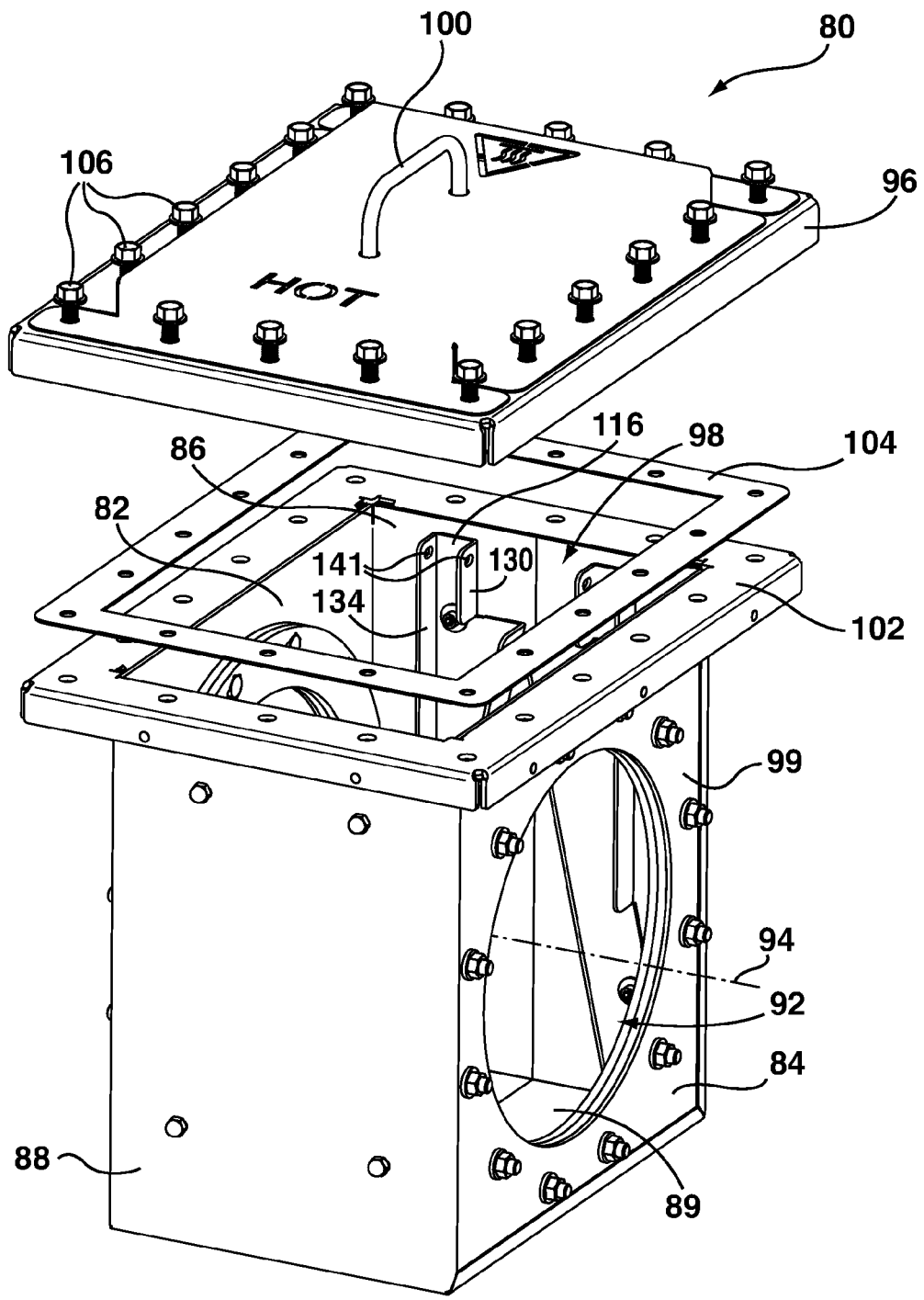
FIG. 10 is a partially exploded view of the housing of FIG. 9, with a cover of the housing spaced away from a base portion.

Referring to FIGS. 9 and 10, an example of a housing is shown generally at reference numeral 80. The housing 80 is shown to be generally box-shaped, and includes a first end wall 82, a second end wall 84, a first side wall 86, a second side wall 88, and a bottom wall 89. The first end wall 82 includes an inlet port 90, and the second end wall 84 includes an outlet port 92. In use, the ports 90, 92 are connected to an upstream source of fluid to be treated and downstream equipment, respectively, or vice versa. The ports 90, 92 may be bolted, welded, or otherwise connected to piping (not shown) to supply the fluid to be treated to the housing 80, and deliver the treated fluid away from the housing 80.

In the example illustrated, the ports 90, 92 are shown to be generally circular openings, and are arranged in alignment to define a central axis 94 that extends through the housing 80. Thus, in the example illustrated, the housing 80 defines a fluid conduit oriented generally parallel to the central axis 94 between the ports 90, 92. The end walls 82, 84 may be generally transversely oriented relative to the central axis 94. Shaping of the ports 90, 92 may generally match the end faces 22, 24 of the catalyst matrix 20. However, in some examples, the ports may be configured to have other shapes, which may differ from one another, and the ports may not be arranged in alignment.

The housing 80 includes a removable cover 96 that, once removed, exposes an access opening 98 in a base portion 99 of the housing 80 (shown in FIG. 10). The cover 96 is shown as a generally planar panel, having a top handle 100. The cover 96 is attached in a sealed, removable manner to a sill 102. An optional gasket 104 may be sandwiched between the cover 96 and the sill 102 to form a seal therebetween. In the example illustrated, the cover 96 and the sill 102 each include holes that are aligned when the cover 96 is properly mated with the sill 102, and a plurality of bolts 106 are used to connect the cover 96 and the sill 102 via the holes. The bolts 106 engage nuts 107, which are fixed relative to the sill 102 (shown in FIG. 13). The bolts 106 may provide a solid connection, and facilitate relatively easy removal of the cover 96 to expose the access opening 98. In some examples, other means of sealably attaching a door or a cover to enclose the access opening 98 may be implemented.

Although the port 90 is described herein as an inlet, and the port 92 is described as an outlet, the ports 90, 92 may instead be connected to the downstream equipment and the upstream source of fluid, respectively, so that the port 92 receives an incoming stream of fluid. Accordingly, in the example illustrated, each side is illustrated generally as a mirror image of the other, and, for simplicity and clarity of illustration, only the side adjacent to the inlet port 90 is described in detail.

Figure 12:
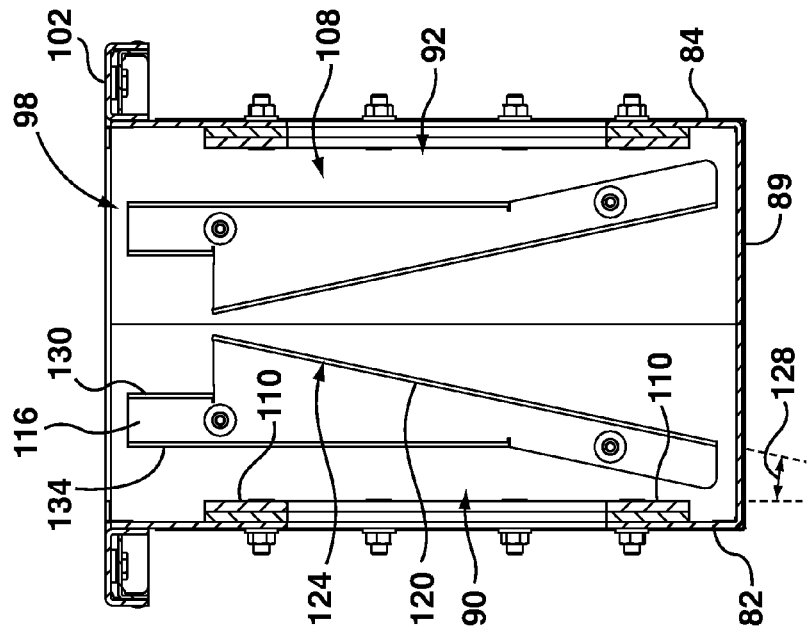
FIG. 12 is a sectional view along line 12-12 in FIG. 11.
Figure 11:
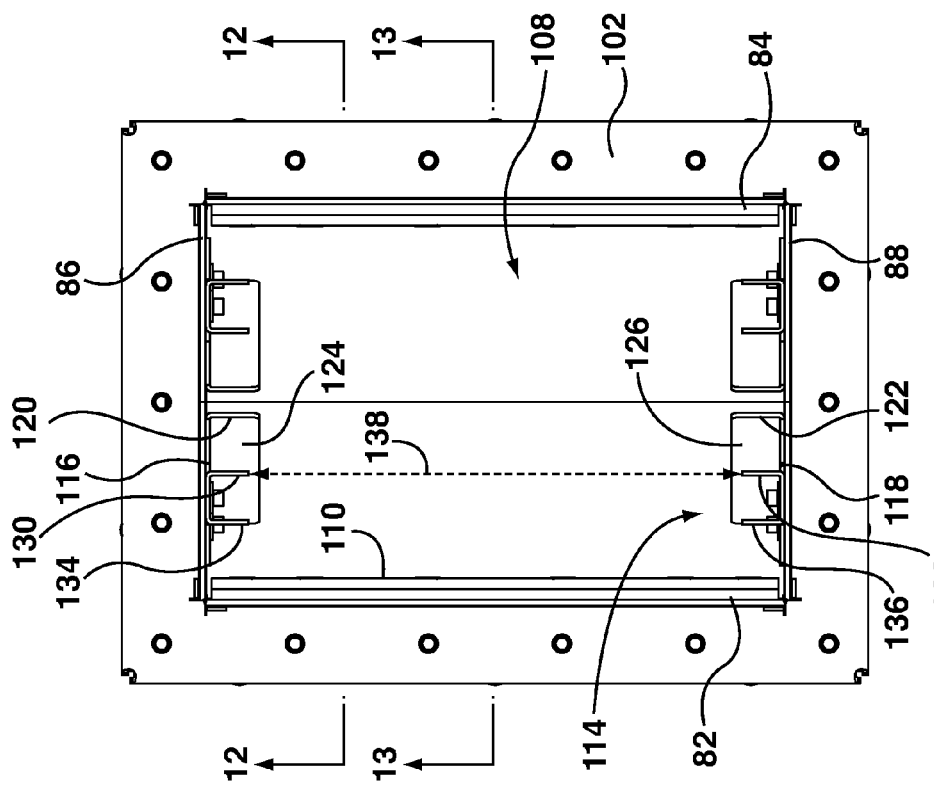
FIG. 11 is a top view of the housing of FIG. 9, shown without the cover.

Referring now to FIGS. 11 and 12, a chamber 108 is defined between the ports 90, 92. In the chamber 108, an interior sealing surface 110 generally encompasses a periphery of the port 90. A positioning mechanism 114 is arranged in the chamber 108. The positioning mechanism 114 is configured to removably support the substrate assembly 50 (shown in FIG. 6) within the chamber 108.

In the example illustrated, the positioning mechanism 114 includes first and second bracket members 116, 118 fixed to the side walls 86, 88, respectively. The bracket members 116, 118 include elongate first tabs 120, 122, respectively, which are spaced apart from one another and extend upwardly within the chamber 108. The first tabs 120, 122 present first and second guiding surfaces 124, 126, which are inclined at a tab angle 128 relative to the interior sealing surface 110. The guiding surfaces 124, 126 are configured to slidingly receiving the frame 52 of the substrate assembly 50 (shown in FIG. 6).

The bracket members 116, 118 may also include second tabs 130, 132 and third tabs 134, 136, respectively, each of which may be oriented generally parallel to the interior sealing surface 110, and are disposed closer to the interior sealing surface 110 than the first tabs 120, 122. The tabs 130, 132 and the tabs 134, 136 may help to guide the side plates 58, 60 to locate the frame 52 of the substrate assembly 50 (shown in FIG. 6) generally intermediate between the side walls 86, 88. A transverse dimension 138 between inward ends of the tabs 130, 134 and the tabs 132, 136 may accommodate a transverse width of the frame 52 between the side plates 58, 60. The tabs 130, 134 (FIG. 10) may also include holes 141 for anchoring a retaining device, described below. Although not shown, similar holes may also be provided on the tabs 132, 136, on the other side of the chamber 108.

Referring to FIGS. 13 and 14, the substrate assembly 50, including the catalyst matrix 20, the collar 38 and the frame 52, may be inserted into the chamber 108 and removed from the chamber 108 through the access opening 98. The first flap 76 of the frame 52 slidingly mates with the first guiding surface 124. Similarly, although not shown, the second flap 78 of the frame 52 slidingly mates with the second guiding surface 126. The guiding surfaces 124, 126 guide the frame 52 towards the inlet port 90, so that movement of the substrate assembly 50 in a lateral direction 142 correspondingly moves the substrate assembly in an axial direction 144. The frame 52 may be moved until the flange element 40 abuts and bears against the interior sealing surface 110, and the substrate axis 28 of the catalyst matrix 20 (see FIGS. 3 and 4) is generally collinear with the axis of the 94 of the housing 80 (see FIGS. 9 and 10).

In the example illustrated, the directions 142, 144 are generally orthogonal. The lateral direction 142 is shown to be downwards, and is generally parallel to the interior sealing surface 110. The axial direction 144 is shown to be outwards, and is generally perpendicular to the interior sealing surface 110.

Figure 15:
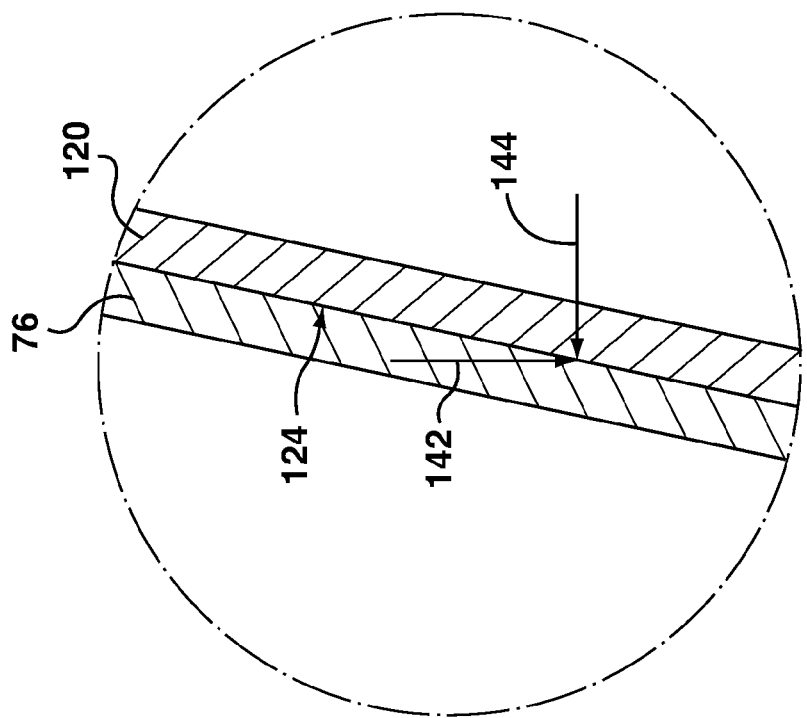

Referring now to FIG. 15, the first flap 76 of the frame 52 engages the first guiding surface 124 so that force applied to the frame 52 in the lateral direction 142 resolves into force in the axial direction 144. In this manner, the substrate assembly 50 is positioned against the interior sealing surface 110 by means of mechanical wedge action. Furthermore, the flap angle 112 of the flaps 76, 78 (see FIG. 8) may generally match the tab angle 128 of the guiding surfaces 124, 126, so that the flaps 76, 78 and the guiding surfaces 124, 126 may frictionally engage generally along their length. In some examples, friction across the surface area between the flaps 76, 78 and the guiding surfaces 124, 126 may help to lock the flaps 76, 78 into position relative to the guiding surfaces 124, 126.

Figure 16:
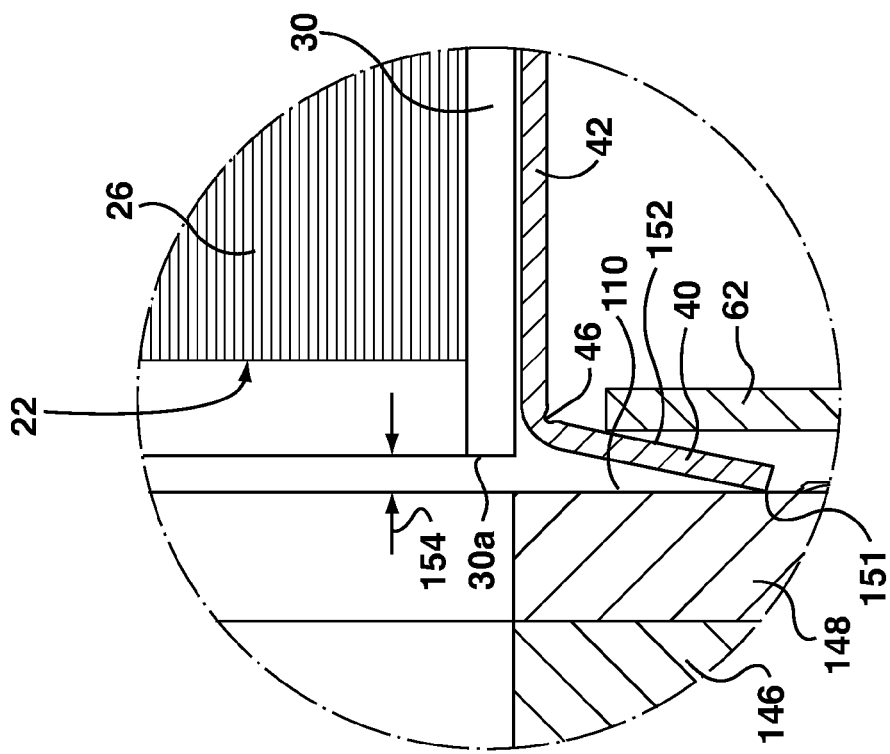
FIGS. 15 and 16 are enlarged sectional views of FIG. 14.

Referring to FIG. 16, the flange element 40 flexes against the interior sealing surface 110, which may help to form a seal without a gasket. The front plate 62 is shown to be arranged parallel to the interior sealing surface 110. In the example illustrated, the front plate 62 engages an inward surface 152 of the flange element 40 to cause the flange element 40 to flex against the interior sealing surface 110. Accordingly, the front plate 62 may distribute sealing force to the flange element 40 generally without transmitting a portion of the load through the catalyst matrix 20.

The amount of force in which the flange element 40 bears against the interior sealing surface 110 may vary, and should be sufficient to maintain the seal under expected operating pressure conditions with fluid flowing through the passages 26. As mentioned above, in the event of misfire or abnormally high pressure pulsations, the line of reduced thickness 46 may permit failure of the collar 38 generally between the flange element 40 and the annular wall 42, in order to avoid or at least reduce damage to the catalyst matrix 20.

The interior sealing surface 110 may be a generally planar surface so that good contact may be made with an outward edge 151 of the flange element 40. In the example illustrated, the interior sealing surface 110 is formed by first and second inner wall elements 146, 148 that are fixed to the end wall 82, generally surrounding the inlet port 90 (see also FIG. 13). The inner wall elements 146, 148 are shown to be generally ring-shaped, and may be formed of a heat-resistant material such as stainless steel, or a ceramic material. The laminated structure of the inner wall elements 146, 148 may be relatively rigid and exhibit little deformation when bearing the force applied by the flange element 40. The inner wall elements 146, 148 may also serve as a thermal barrier to reduce conduction of heat out of the chamber 108.

Figure 5:
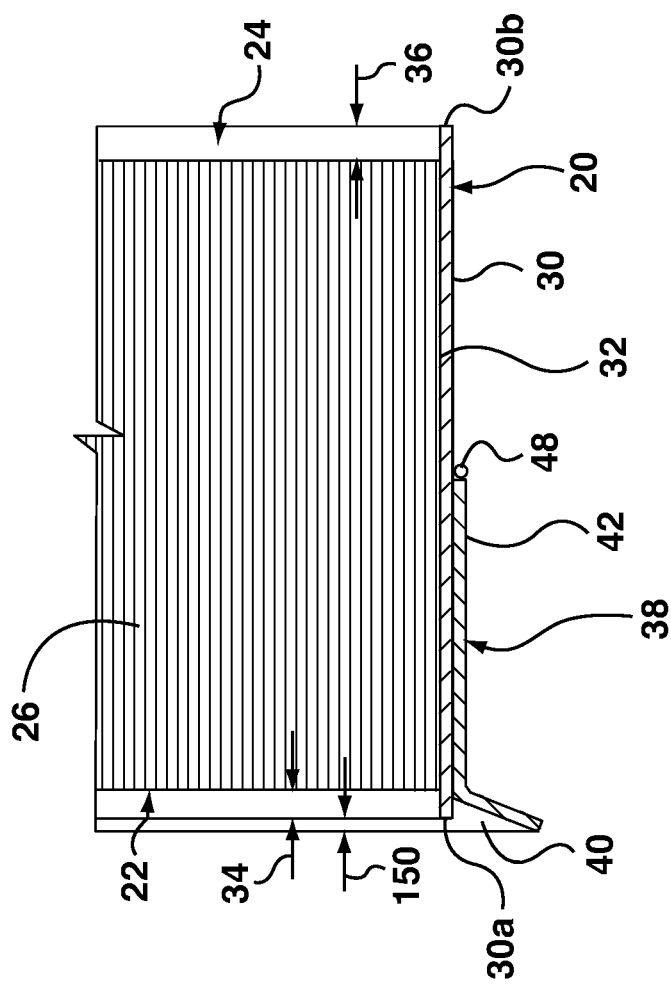
FIG. 5 is an enlarged sectional view along line 5-5 in FIG. 4.

With reference to both FIGS. 5 and 16, the outward edge 151 of the flange element 40 is axially outboard of the end edge 30a, providing an offset 150 when the flange element 40 is unloaded (FIG. 5), and an offset 154 when the flange element 40 is in a flexed condition against the interior sealing surface 110 (FIG. 16). With the offset 154, in the event that there is not perfect alignment between the substrate assembly 50 and the interior sealing surface 110, or slight dimensional variations between these parts, the peripheral mantle 30 may not interfere with the flange element 40 in forming a seal with the interior sealing surface 110.

Figure 17:
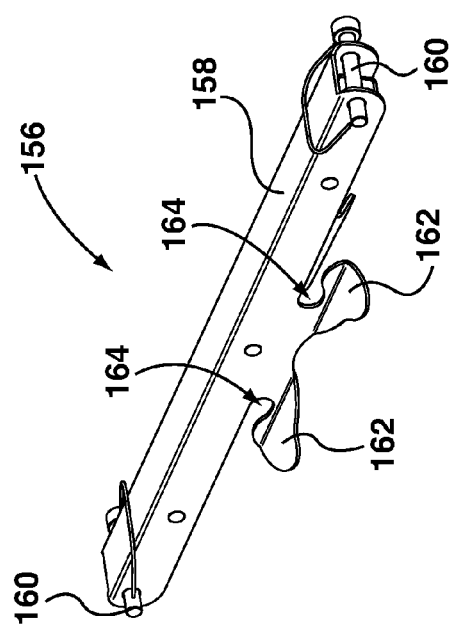
FIG. 17 is a perspective view of a retaining device.

Referring to FIG. 17, an optional retaining device 156 may be used to help maintain the substrate assembly 50 in sealing engagement within the housing 80. In the example illustrated, the retaining device 156 includes an elongate bar 158, with fastening pins 160 arranged on either end. The pins 160 are received in the holes 141 (shown in FIG. 10) to lock the retaining device 156 in place towards the top of the bracket members 116, 118 (shown in FIG. 11). One or more engagement elements 162 extend from below a bottom edge of the bar 158, with cutaways 164 arranged generally therebetween. In the example illustrated, the engagement elements 162 are flexible and resilient, and are arranged to exert a force onto the frame 52 generally in the lateral direction 142 (see FIG. 13). In some examples, the cover 96 or another component within the chamber 108 may be arranged to exert force onto the frame 52 and/or the substrate assembly 50 to maintain sealed engagement between the substrate assembly 50 and the housing 80.

Figure 18:
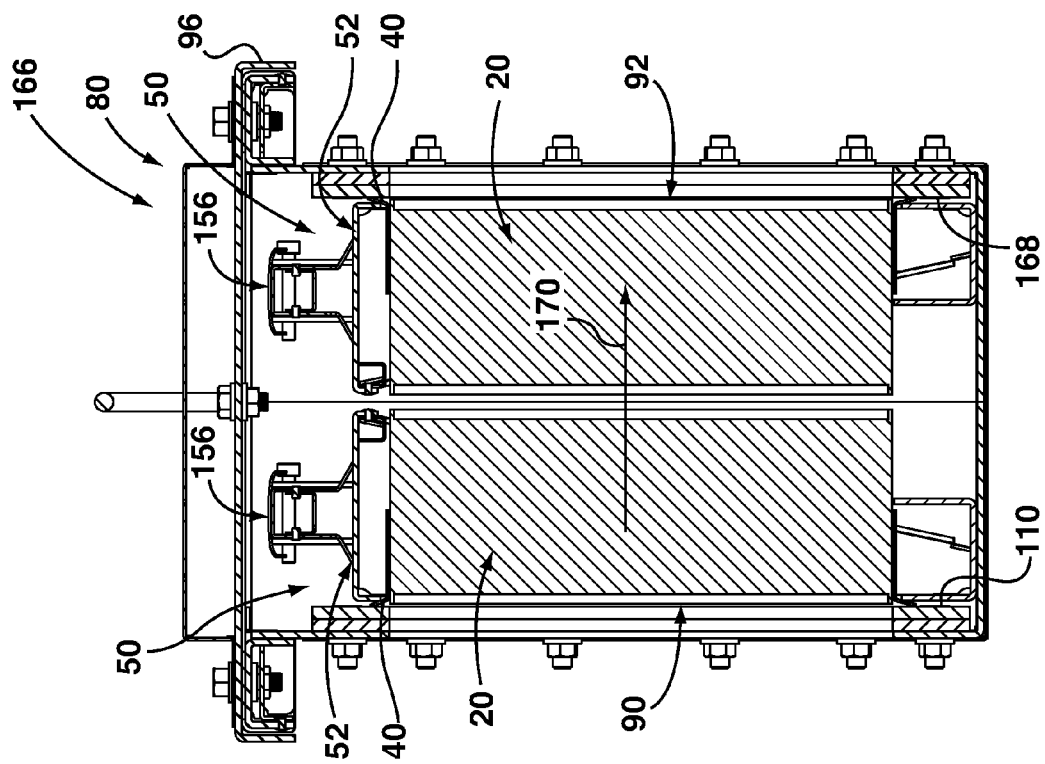
FIG. 18 is a further sectional view along line 13-13 in FIG. 11, and showing a pair of the substrate assemblies installed in the housing.

Referring to FIG. 18, a catalyst converter apparatus 166 includes two of the substrate assemblies 50 received in the housing 80, with the cover 96 fixed in place. In the example illustrated, the catalytic converter apparatus 166 removably houses two of the substrate assemblies 50. However, it will be recognized that the apparatus may be configured to removably contain only one of the substrate assemblies 50, or three or more of the substrate assemblies 50, arranged in series.

In use, the catalytic converter apparatus 166 is connected to piping (not shown) so that the fluid to be treated is supplied to the inlet port 90, and treated fluid is delivered away from the outlet port 92. For example, in engine exhaust treatment implementations, the inlet port 90 may be bolted, welded, or otherwise connected (e.g., using one or more band clamps) to piping that is attached to an engine exhaust manifold. The outlet port 92 may similarly be bolted, welded, or otherwise connected to piping that leads optionally to a heat exchanger and/or a muffler device, and delivers the treated exhaust gas to the atmosphere.

The cover 96 is unfastened, and both of the substrate assemblies 50 are inserted into the housing 80, and are removably supported therein. The flange element 40 of each of the substrate assemblies 50 bears outwardly against interior sealing surfaces 110, 168 in sealing engagement, which provides a fluid flow path 170 through the catalyst matrixes 20 between the ports 90, 92. The frame 52 of each of the substrate assemblies 50 is urged downwardly by the optional retaining devices 156, to help maintain the substrate assemblies 50 in sealing engagement with the ports 90, 92.

The housing 80 both during heat up and steady state operation may be about 100° C. cooler than the catalyst matrix 20. This is because the catalyst matrix 20 may be subjected to exhaust gases (or another fluid to be treated that is at an elevated temperature), but has nowhere to conduct or radiate heat away. In contrast, the housing 80 may radiate or conduct heat into the surrounding environment. Upon shutdown or low engine loads, the rate of the temperature loss from the housing 80 may be less than that of the catalyst matrix 20, because the housing 80 may be of heavy gauge metal whereas the catalyst matrix 20 may be formed of thin sheet metal with large surface area. Thus, the housing 80 under low engine load conditions may be about 100-150° C. hotter than the catalyst matrix 20.

Considering the overall size of a stationary or industrial sized unit, this temperature differential may result in significant dimensional differences between the housing 80 and the catalyst matrix 20. These must be accommodated to avoid undue stress damaging either component while ensuring adequate sealing therebetween so as to avoid fluid escaping between the housing 80 and the catalyst matrix 20. Some large industrial catalytic converters are sealed about a periphery of the catalyst substrate with a ceramic fiber material. Such material may be prone to erosion, for example, by high velocity gas and mechanical breakdown through compression and vibration. Furthermore such material is easily torn and difficult to maintain in place during installation, particularly with larger units. By avoiding a use of a gasket, the seal formed between the flange element 40, and the interior sealing surfaces 110, 168 may provide good durability throughout wide range of operating temperatures, and the maintenance and durability issues associated with conventional gaskets may be eliminated.

While the above description provides examples of one or more apparatuses or methods, it will be appreciated that other apparatuses or methods may be within the scope of the accompanying claims.

We claim:

1. A catalytic converter apparatus, comprising:
   a housing comprising an inlet port, an outlet port spaced apart from the inlet port, a chamber between the inlet and outlet ports, an access opening for access to the chamber, and an interior sealing surface generally encompassing a periphery of one of the inlet and outlet ports in the chamber;
   a substrate assembly insertable into the chamber and removable from the chamber through the access opening, the substrate assembly comprising a catalyst matrix for treating fluid, and a flange element extending about a periphery of an end face of the catalyst matrix, the flange element for abutting the interior sealing surface; and
   a positioning mechanism for removably supporting the substrate assembly within the chamber,
   wherein the flange element and the interior sealing surface engage to seal a fluid flow path between the catalyst matrix and the one of the inlet and outlet ports without a gasket.

2. The apparatus of claim 1, wherein the interior sealing surface is formed by an inner wall element that is fixed to an end wall generally surrounding the one of the inlet and outlet ports.

3. The apparatus of claim 2, wherein the flange element is configured to flex against the inner wall element.

4. The apparatus of claim 3, wherein the flange element is coupled to an annular wall generally surrounding a peripheral mantle of the catalyst matrix, and the flange element is flared outwardly at an angle relative to the annular wall.

5. The apparatus of claim 4, wherein the substrate assembly comprises a line of reduced thickness arranged generally between the annular wall and the flange element.

6. The apparatus of claim 1, wherein
   the positioning mechanism is configured to removably support the substrate assembly within the chamber so that movement of the substrate assembly in a lateral direction generally parallel to the interior sealing surface moves the substrate assembly in an axial direction generally perpendicular to the interior sealing surface.

7. The apparatus of claim 1, wherein the housing comprises first and second ones of the positioning mechanisms within the chamber, the first and second positioning mechanisms arranged to guide first and second ones of the substrate assemblies into sealing engagement with the inlet and the outlet ports, respectively.

8. The apparatus of claim 7, wherein movement of the first and second substrate assemblies in the lateral direction causes the substrate assemblies to move outwardly away from one another in the axial direction.

9. The apparatus of claim 8, wherein each of the positioning mechanisms comprises a retaining device for exerting a force onto the respective substrate assembly generally in the lateral direction to maintain the substrate assembly in sealing engagement.

10. The apparatus of claim 6, wherein the substrate assembly comprises a frame for holding the catalyst matrix, and the positioning mechanism guides the frame to move the substrate assembly in the axial direction into sealing engagement with the one of the inlet and outlet ports, thereby providing the fluid flow path through the catalyst matrix between the inlet and outlet ports.

11. The apparatus of claim 10, wherein the frame comprises a front plate having an opening, and the catalyst matrix is received in the opening with the flange element engaging the front plate in opposed relation, so that the frame distributes force from the positioning mechanism to the flange element.

12. The apparatus of claim 10, wherein force applied to the frame in the lateral direction resolves into force of the substrate assembly in the axial direction bearing against the interior sealing surface.

13. The apparatus of claim 12, wherein the positioning mechanism comprises first and second guiding surfaces for slidingly receiving the frame, the first and second guiding surfaces arranged on generally opposing first and second sides of the chamber, respectively.

14. The apparatus of claim 13, wherein the guiding surfaces are inclined at an angle relative to the interior sealing surface.

15. The apparatus of claim 14, wherein the frame comprises outwardly extending first and second flaps that slidingly mate with the first and second guiding surfaces, respectively.

16. The apparatus of claim 15, wherein the flaps and the guiding surfaces are configured to frictionally engage so that the substrate assembly locks into position relative to the housing.

17. The apparatus of claim 12, wherein the positioning mechanism comprises a retaining device for maintaining the substrate assembly in sealing engagement with the one of the inlet and outlet ports.

18. The apparatus of claim 17, wherein the retaining device exerts a force onto the frame generally in the lateral direction.

19. A catalytic converter apparatus, comprising:
    a housing comprising a port, and an interior sealing surface generally encompassing a periphery of the port; and
    a substrate assembly removably supported relative to the housing, the substrate assembly comprising a frame, a catalyst matrix supported by the frame and comprising an end face, and a flange element extending about a periphery of the end face of the catalyst matrix,
    wherein the flange element comprises an inward surface, and an outward edge that is spaced apart from the end face of the catalyst matrix in a lateral direction generally parallel to the interior sealing surface,
    wherein the outward edge of the flange element abuts the interior sealing surface,
    wherein the frame engages the inward surface of the flange element, and
    wherein the frame distributes force to the flange element so that the flange element bears against the interior sealing surface to provide a generally sealed fluid flow path through the catalyst matrix and the port.

20. The catalytic converter apparatus of claim 19, further comprising a positioning mechanism for removably supporting the substrate assembly within the housing so that movement of the substrate assembly in the lateral direction moves the substrate assembly in an axial direction generally perpendicular to the interior sealing surface.

21. The catalytic converter apparatus of claim 20, wherein:
    the positioning mechanism comprises at least one guiding surface for slidingly receiving the frame, and the at least one guiding surface is inclined at an angle relative to the interior sealing surface; and the frame comprises at least one outwardly extending flap, and the at least one flap slidingly mates with the at least one guiding surface, wherein force applied to the frame in the lateral direction resolves into force of the flange element in the axial direction bearing against the interior sealing surface.

22. The catalytic converter apparatus of claim 19, wherein the flange element is configured to flex against the interior sealing surface.

23. The catalytic converter apparatus of claim 22, wherein the flange element is coupled to an annular wall generally surrounding a peripheral mantle of the catalyst matrix, and the flange element is flared outwardly at an angle relative to the annular wall.

24. The catalytic converter apparatus of claim 19, wherein the frame comprises a front plate having an opening, and the catalyst matrix is received in the opening with the inner surface of the flange element engaging the front plate in opposed relation.

25. The catalytic converter apparatus of claim 19, wherein the outward edge of the flange element is arranged outboard of the catalyst matrix in an axial direction generally perpendicular to the interior sealing surface, thereby providing an offset between the catalyst matrix and the interior sealing surface.

* * * * *